(12) United States Patent
Souers et al.

(10) Patent No.: US 10,989,294 B2
(45) Date of Patent: Apr. 27, 2021

(54) PLANETARY DRIVE ASSEMBLY AND METHOD OF CONNECTING A PLANET CARRIER TO A SPLINED PART

(71) Applicant: Schaeffler Technologies AG & Co. KG, Herzogenaurach (DE)

(72) Inventors: Long Souers, North Canton, OH (US); Jordan Geiser, Dalton, OH (US); Michael Hodge, Creston, OH (US); Drew Hilty, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 195 days.

(21) Appl. No.: 16/246,795

(22) Filed: Jan. 14, 2019

(65) Prior Publication Data
US 2020/0224755 A1    Jul. 16, 2020

(51) Int. Cl.
| | | |
|---|---|---|
| *F16H 57/02* | (2012.01) | |
| *F16H 57/00* | (2012.01) | |
| *F16H 57/08* | (2006.01) | |
| *B23D 3/02* | (2006.01) | |
| *F16D 1/108* | (2006.01) | |
| *F16D 1/10* | (2006.01) | |

(52) U.S. Cl.
CPC ........... *F16H 57/0025* (2013.01); *B23D 3/02* (2013.01); *F16D 1/108* (2013.01); *F16H 57/082* (2013.01); *F16D 2001/103* (2013.01); *F16D 2250/0084* (2013.01)

(58) Field of Classification Search
CPC .............................. F16D 1/072; F16H 57/0025
See application file for complete search history.

(56) References Cited

U.S. PATENT DOCUMENTS

| | | |
|---|---|---|
| 3,939,736 A | 2/1976 | Morin |
| 4,380,274 A | 4/1983 | Abraham et al. |
| 4,898,065 A | 2/1990 | Ogata et al. |
| 7,556,583 B2 | 7/2009 | Wang et al. |
| 2004/0035000 A1 * | 2/2004 | Nakajima ............... F16D 1/101 29/894.3 |

FOREIGN PATENT DOCUMENTS

| | | |
|---|---|---|
| JP | 2000-042845 A | 2/2000 |
| JP | 2015-178122 A | 8/2015 |
| KR | 10-2015-0023813 A | 3/2015 |
| WO | WO2014038096 A1 | 3/2014 |

OTHER PUBLICATIONS

Corresponding Search Report for International Application No. PCT/US2020/012504.

* cited by examiner

*Primary Examiner* — Derek D Knight
(74) *Attorney, Agent, or Firm* — Davidson, Davidson & Kappel, LLC

(57) ABSTRACT

A drive assembly for a motor vehicle drive train includes a shaft including a plurality of axially extending splines defining an outer circumferential surface, and a planet carrier non-rotatably fixed to the shaft by the axially extending splines. The planet carrier and the shaft are axially constrained with respect to each other by a radially inwardly extending material of the planet carrier axially contacting a radially extending surface of the shaft.

19 Claims, 10 Drawing Sheets

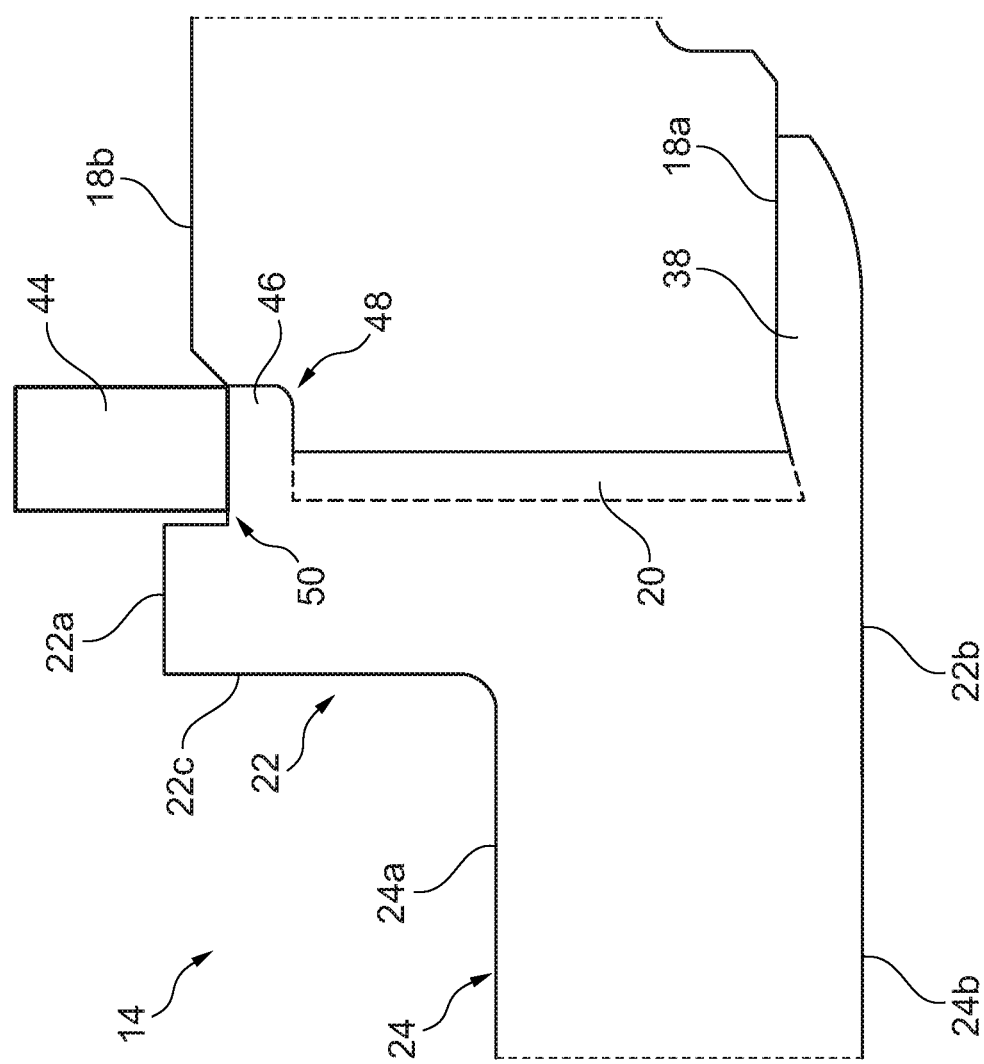

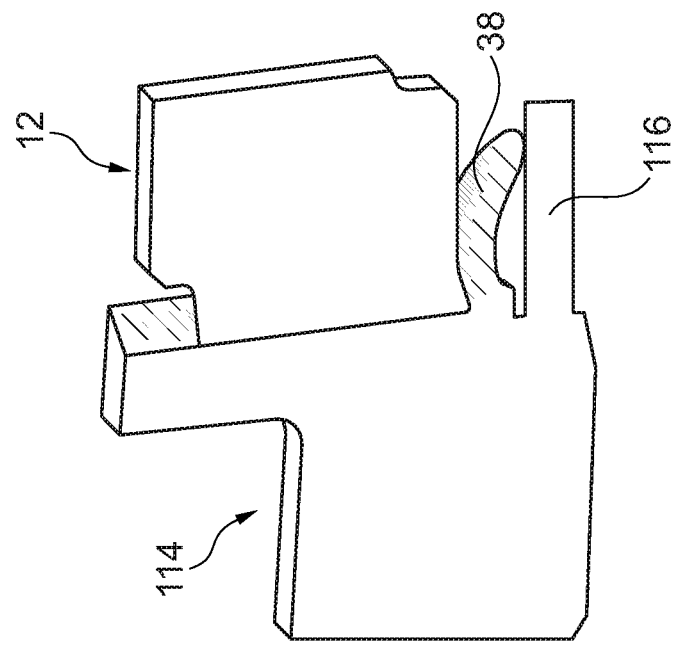
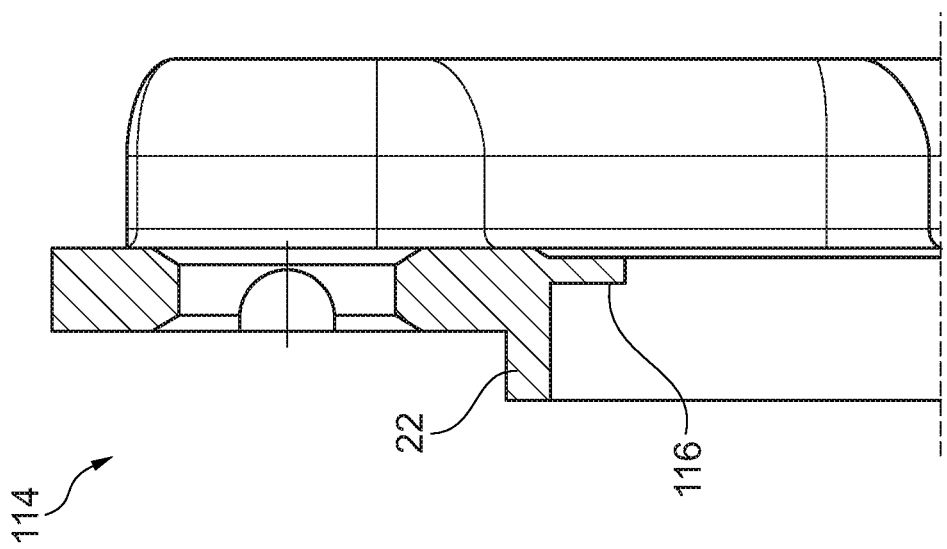

PLANETARY DRIVE ASSEMBLY AND METHOD OF CONNECTING A PLANET CARRIER TO A SPLINED PART

The present disclosure relates generally to planetary drive assembly and more specifically to methods for connecting a planet carrier to a splined part.

BACKGROUND

It is known to form a spline connection between a shaft and planetary carrier and to weld a shaft to a planetary carrier.

SUMMARY OF THE INVENTION

A drive assembly for a motor vehicle drive train includes a shaft including a plurality of axially extending splines defining an outer circumferential surface, and a planet carrier non-rotatably fixed to the shaft by the axially extending splines. The planet carrier and the shaft are axially constrained with respect to each other by a radially inwardly extending material of the planet carrier axially contacting a radially extending surface of the shaft.

In embodiments of the drive assembly, the radially inwardly extending material is formed of chip material cut out of an inner circumferential surface of the planet carrier. The radially inwardly extending material may be a staked portion of the planet carrier. The planet carrier and the shaft may be axially constrained with respect to each other by a further radially inwardly extending material contacting a further radially extending surface of the shaft. The axially extending splines may be axially between the radially inwardly extending material and the further radially inwardly extending material. The radially inwardly extending material may be formed of chip material cut out of an inner circumferential surface of the planet carrier and the radially inwardly extending material may be a staked portion of the planet carrier. The shaft may include a longitudinal base section and a flange section extending radially outward from the longitudinal base section. The flange section may include the radially extending surface axially contacting the radially inwardly extending material of the planet carrier. Each of the axially extending splines may include an angled displacement section axially contacting the planet carrier. The planet carrier may include a cylindrical radially inner section having an inner circumferential surface that is mated with the axially extending splines and an annular radially outer section extending radially outward from the cylindrical radially inner section. The radially inwardly extending material may extend radially inward past the inner circumferential surface of the cylindrical radially inner section. The radially inwardly extending material may protrude axially past a radially extending surface of the cylindrical radially inner section. The annular radially outer section may include a plurality of holes passing axially therethrough each configured for receiving a first axial end of a respective one of a plurality of planet pins. The drive assembly may further include the planet pins and a plurality of planet gears each rotatably mounted on a respective one of the planet pins.

A method of forming a drive assembly for a motor vehicle drive train includes spline-cutting a planet carrier with axially extending splines defining an outer circumferential surface of a shaft to non-rotatably fix the planet carrier to the shaft; and axially constraining the planet carrier and the shaft with respect to each other by forcing a radially inwardly extending material of the planet carrier into axial contact with a radially extending surface of the shaft.

In embodiments of the method, the forcing of the radially inwardly extending material of the planet carrier into axial contact with the radially extending surface of the shaft may include forcing chip material cut out of an inner circumferential surface of the planet carrier by the axially extending splines into axial contact with the radially extending surface of the shaft. The spline-cutting of the planet carrier with the axially extending splines may include axially forcing an angled displacement section of each of the axially extending splines into the planet carrier to cut out the chip material. The angled displacement section may force the chip material radially inward into a radially extending stop surface to form the radially inwardly extending material. The forcing of the radially inwardly extending material of the planet carrier into axial contact with the radially extending surface of the shaft may include axially staking the planet carrier. The planet carrier may include a cylindrical radially inner section having an inner circumferential surface that is mated with the axially extending splines and an annular radially outer section extending radially outward from the cylindrical radially inner section. The radially inwardly extending material may extend radially inward past the inner circumferential surface of the cylindrical radially inner section. The cylindrical radially inner section may include a radially extending axially facing surface including a staking section that is axially staked to axially constrain the shaft and the planet carrier with respect to each other and a stability section limiting a radial deformation of an outer circumferential surface the cylindrical radially inner section during the axial staking. The method may further including further axially constraining the planet carrier and the shaft with respect to each other by forcing a further radially inwardly extending material of the planet carrier into axial contact with a further radially extending surface of the shaft. The axially extending splines may be axially between the radially inwardly extending material and the further radially inwardly extending material. The forcing of the radially inwardly extending material of the planet carrier into axial contact with the radially extending surface of the shaft may include forcing chip material cut out of an inner circumferential surface of the planet carrier by the axially extending splines into axial contact with the radially extending surface of the shaft. The forcing of the further radially inwardly extending material of the planet carrier into axial contact with the further radially extending surface of the shaft may include axially staking the planet carrier. The forcing of the radially inwardly extending material of the planet carrier into axial contact with the radially extending surface of the shaft may include axially staking the planet carrier. The forcing of the further radially inwardly extending material of the planet carrier into axial contact with the further radially extending surface of the shaft may include axially staking the planet carrier.

BRIEF DESCRIPTION OF THE DRAWINGS

The present invention is described below by reference to the following drawings, in which:

FIGS. 2a to 2e illustrate a method of joining of a planet carrier and shaft together in accordance with a first embodiment of the present disclosure;

FIG. 3a shows another embodiment of a planet carrier and FIG. 3b show how this planet carrier is joined with the shaft;

DETAILED DESCRIPTION

The present disclosure provides methods of connecting a planet carrier to a splined part, which in some preferred embodiments is a splined shaft, to form a planetary drive assembly.

In a first embodiment, during the forming of the spline on the shaft, a fixed tool can be used in at a bottom of a flanged section of the shaft to constrain a cut chip formation generating by spline cutting the planet carrier. The chip essentially forms multiple stakes to axially constrain the flanged section of the shaft on a first side of the planet carrier, while a second side of the planet carrier is staked to axially contact the flanged section of the shaft. If in reality, the shaft is not moving, but planet carrier is moving, then the fixed tool needs another step to constrain the bottom of shaft.

In a second embodiment, a step is introduced into an inner diameter of the planet carrier when machining the inner diameter. The step can be used to help straighten and support the chip formation.

Figure 1A:
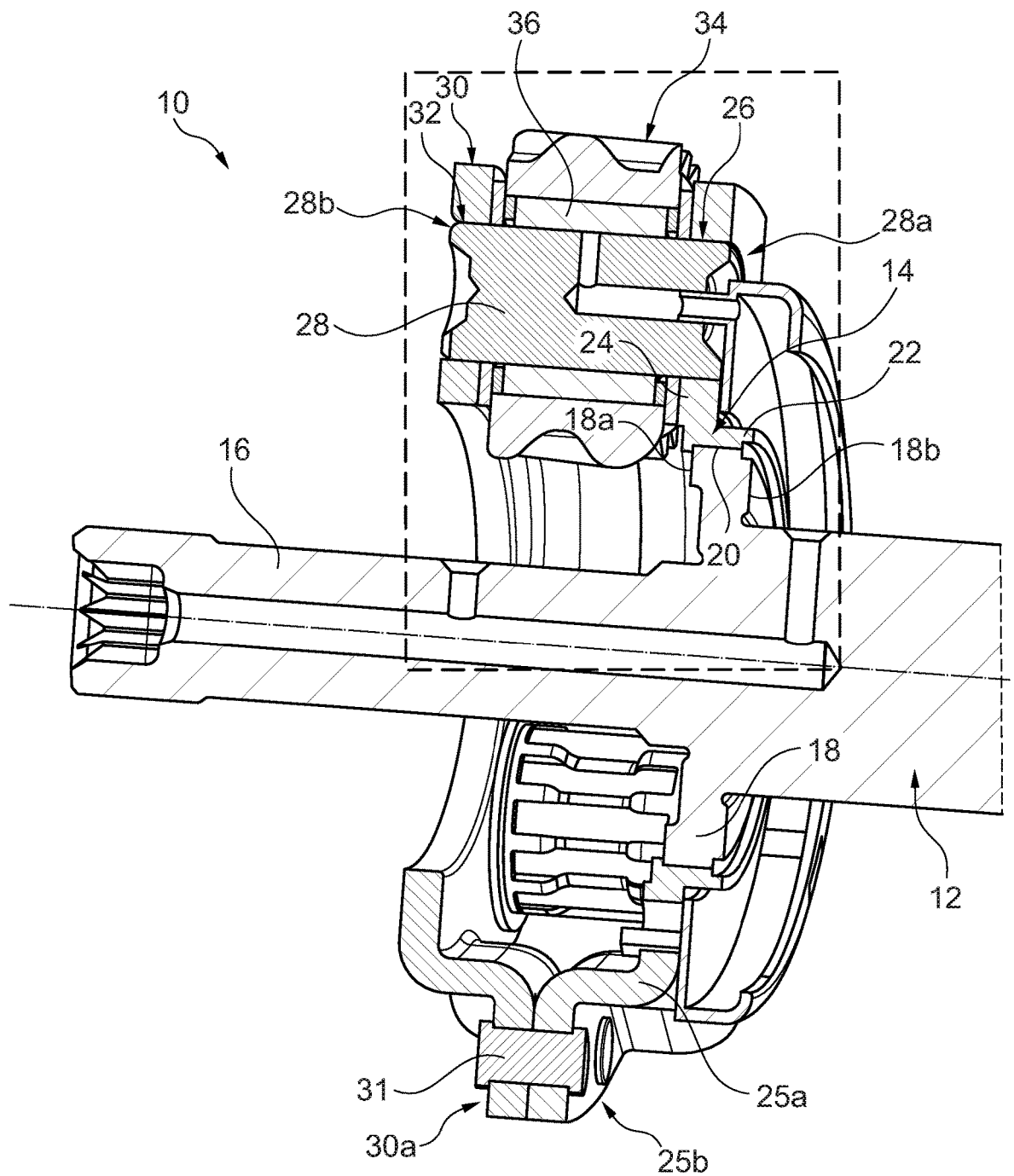
FIGS. 1a and 1b show radially facing cross-sectional views of a planetary drive assembly formed in accordance with an embodiment of the present disclosure.
Figure 1C:
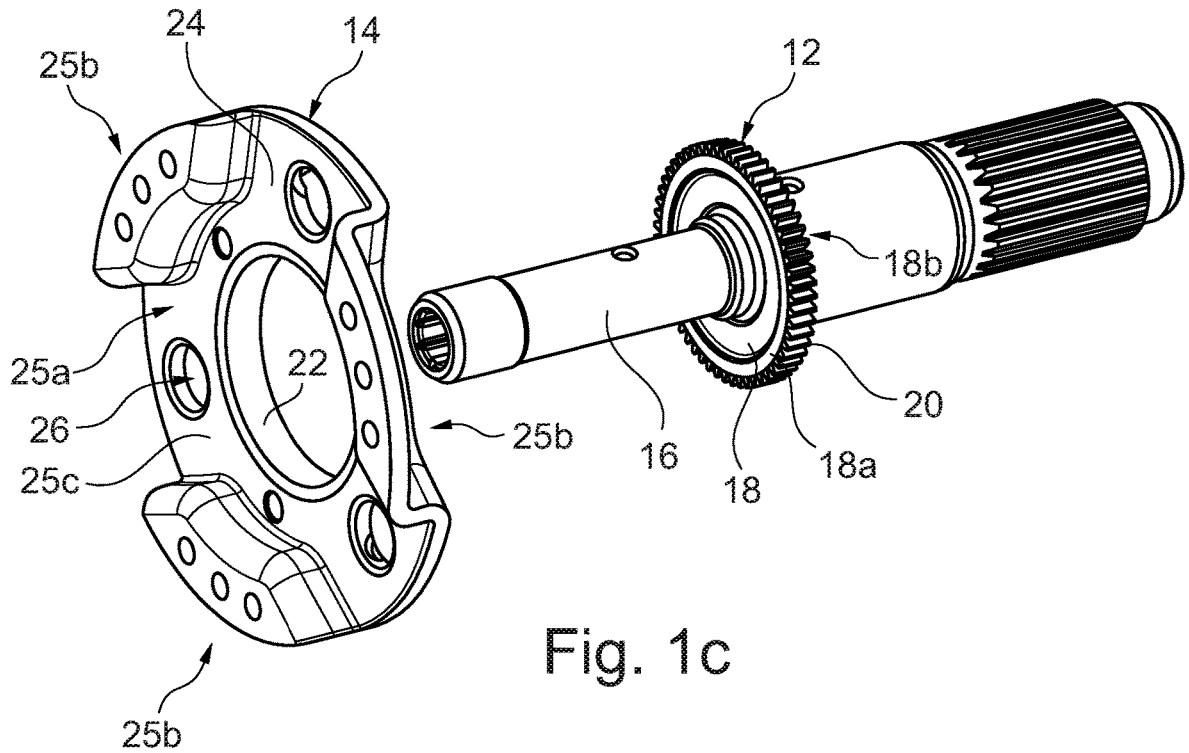
FIG. 1c shows a perspective view of a shaft and a planet carrier of the planetary drive assembly.
Figure 1B:
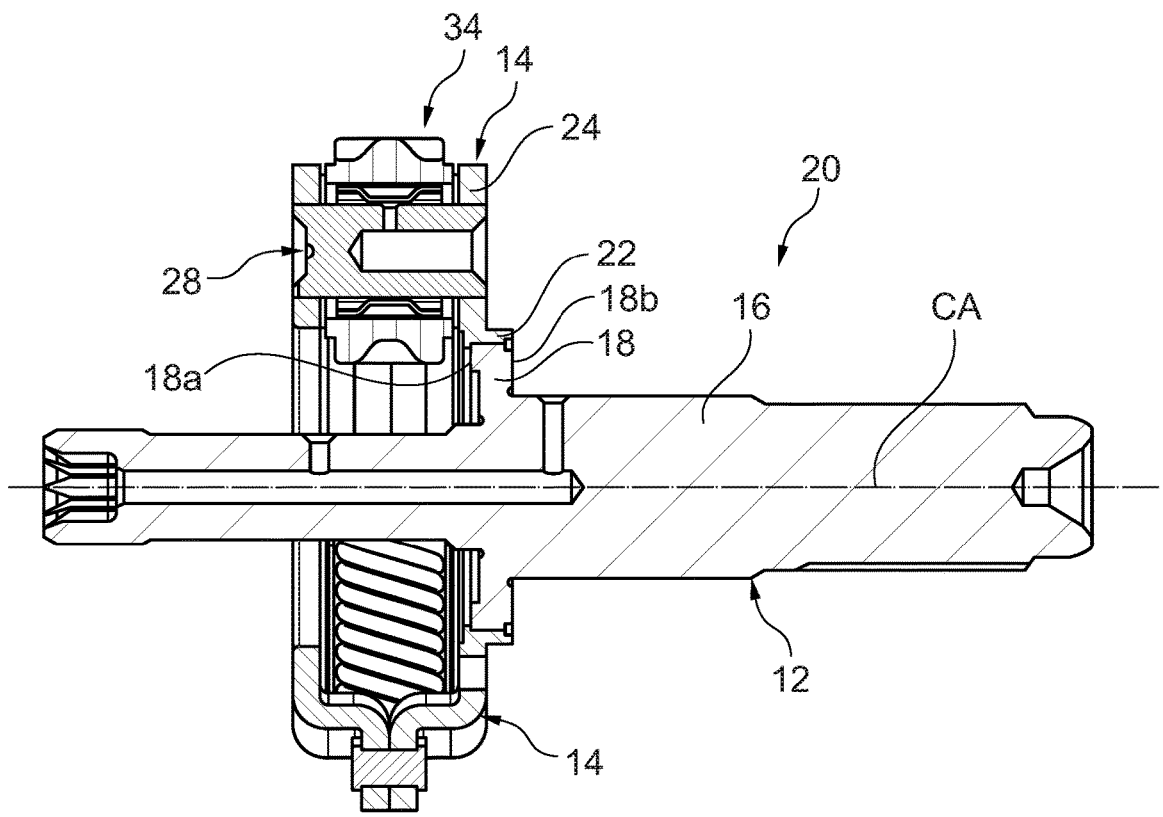

FIGS. 1a and 1b show radially facing cross-sectional views of a planetary drive assembly 10 formed in accordance with an embodiment of the present disclosure. Drive assembly 10 includes a shaft 12 non-rotatably fixed to a planet carrier 14. FIG. 1c shows a perspective view of shaft 12 and planet carrier 14. Shaft 12 is longitudinally centered on and rotatable about a center axis CA. The terms axial, radial and circumferential and derivatives thereof used in the present disclosure are used in reference to center axis CA unless otherwise stated. Shaft 12 includes a longitudinal base section 16 having a generally cylindrical shape and a flange section 18 protruding radially outward from base section 16. Flange section 18 is disc-shaped and includes a plurality of axially aligned splines 20 forming a splined outer circumferential surface of flange section 18. Splines 20 extend axially from a first radially extending axially facing surface 18a of flange section 18 to a second radially extending axially facing surface 18b of flange section 18. Planet carrier 14 is fixed to flange section 18 via splines 20.

Planet carrier 14 includes a cylindrical radially inner section 22 having an inner circumferential surface that is mated with splines 20 and an annular radially outer section 24 extending radially outward from radially inner section 22. Radially outer section 24 includes a plurality of holes 26 passing axially therethrough that each receive a first axial end 28a of a respective one of a plurality of planet pins 28. A further planet carrier 30 includes a plurality of holes 32 passing axially therethrough that each receive a second axial end 28b of a respective one of planet pins 28. Each planet pin 28 is non-rotatably fixed to both of planet carriers 14, 30. Planetary drive assembly 10 further includes a plurality of planet gears 34 that are each rotatably mounted on a respective one of planet pins 28 via rolling members 36 provided radially between pins 28 and the respective planet gear 34. Inner section 22 extends axially away from outer section 24 and from planet gears 34. As shown in FIG. 1c, outer section 24 includes a flat plate base section 25a and plurality of circumferentially spaced connector sections 25b protruding axially away from an axially facing radially extending surface 25c of base section 25a in an axial direction that is opposite to the axial direction that inner section 22 protrudes from base section 25a. Each of connector sections 25b is configured for connecting to a respective connector section 30a of further plate 30. More specifically, each of connector sections 25b contacts the respective connector section 30a and fasteners 31, in the form of rivets, are passed through holes in connector sections 25b, 30a to fix sections 25b, 30a together.

Figure 2A:
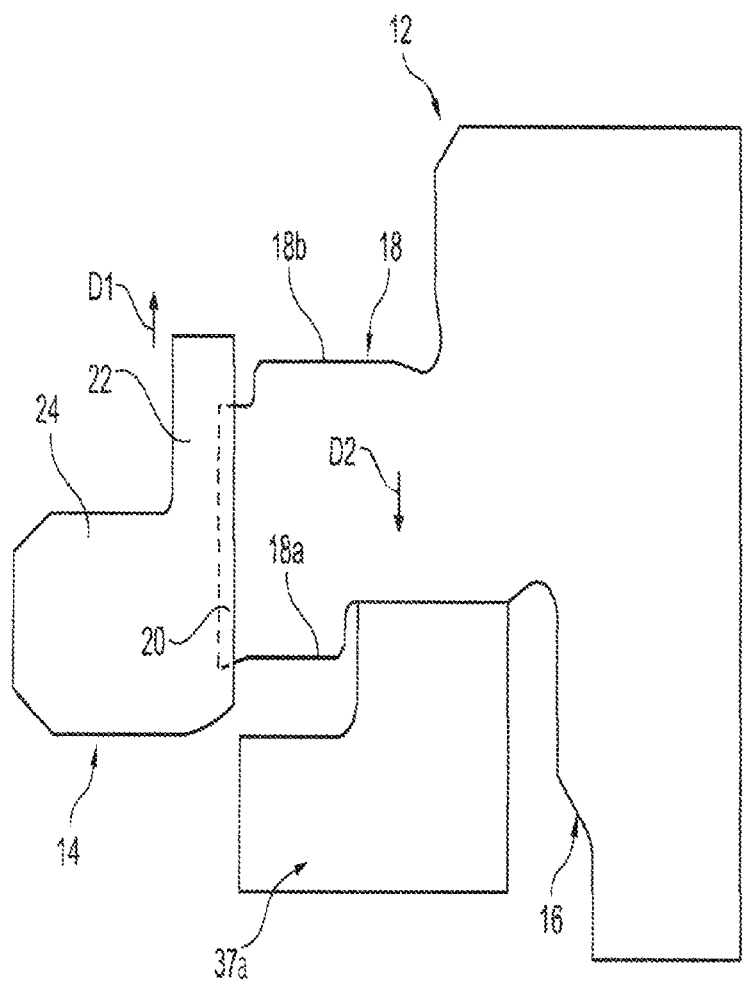

FIGS. 2a to 2e illustrate joining of planet carrier 14 and shaft 12 together in accordance with a first embodiment of the present disclosure. FIG. 2a illustrates a radially facing cross-sectional perspective view of planet carrier 14 and shaft 12 joined together by splines 20 of shaft 12. Planet carrier 14 is made of a softer metal than shaft 12, which is manufactured to include splines 20, and the insertion of shaft 12 into a borehole defined by the inner circumferential surface of planet carrier 14 causes splines 20 to spline-cut axially aligned grooves into the inner circumferential surface of planet carrier 14, thereby forming axially aligned splines defined between the axially aligned grooves.

Figure 2B:
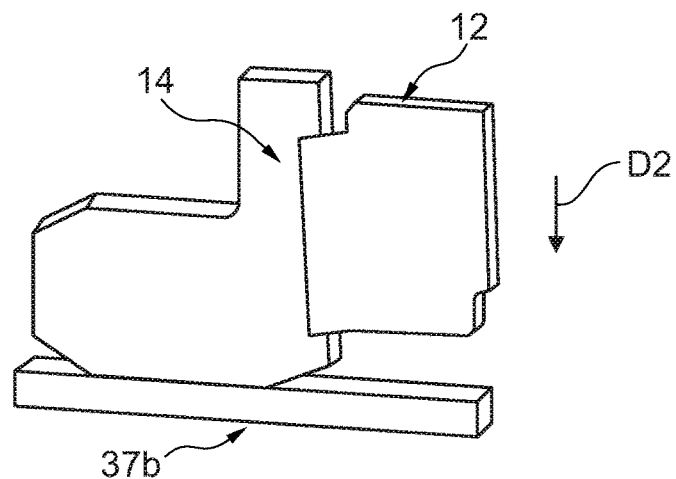

FIG. 2a shows an arrangement of planet carrier 14 on shaft 12 where shaft 12 is fixed in place by a fixed tool 37a. Planet carrier 14 is moved in an axial direction D1 for spline cutting in the embodiment shown in FIG. 2a. In other embodiments, planet carrier 14 may be fixed axially in place while shaft 12 moved in direction D2 that is opposite of axial direction D1 or shaft 12 may be moving in axial direction D2 while planet carrier 14 is moved in direction D1. FIG. 2b shows an arrangement of planet carrier 14 on shaft 12 where planet carrier 14 is fixed in place by a fixed tool 37b. Shaft 12 is moved in an axial direction D2 for spline cutting in the embodiment shown in FIG. 2b.

Figure 2C:
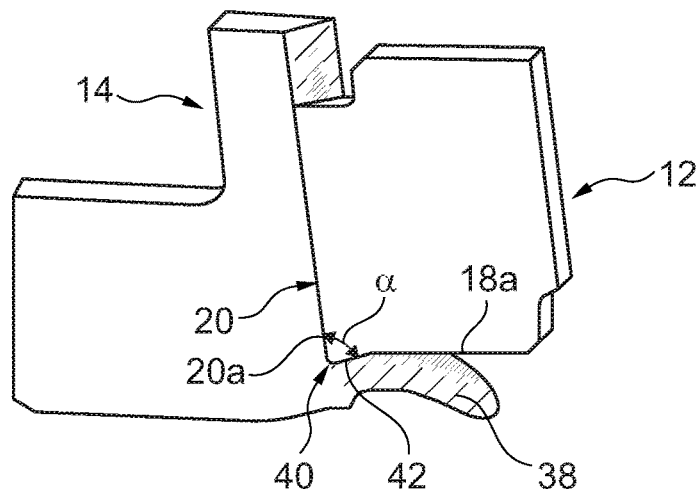

As shown in FIG. 2c, during the axial movement of planet carrier 14 and/or shaft 12 with respect to each other, a chip material 38 at the inner circumferential surface of planet carrier 14 is displaced radially inward by an axial lead edge 40 of each of splines 20. Each axial lead edge 40 extends radially inward from the outer circumferential surface 20a of the respective spline 20 at acute angle α with respect to outer circumferential surface 20a of splines 20 to form a displacement section 42 of surface 18a. As axial lead edge 40 is forced into material of planet carrier 14 and there is axial movement between shaft 12 and planet carrier 14, chip material 38 is forced radially inward by edge 40 along displacement section 42 and radially inward of displacement section 42 along surface 18a.

Figure 2D:
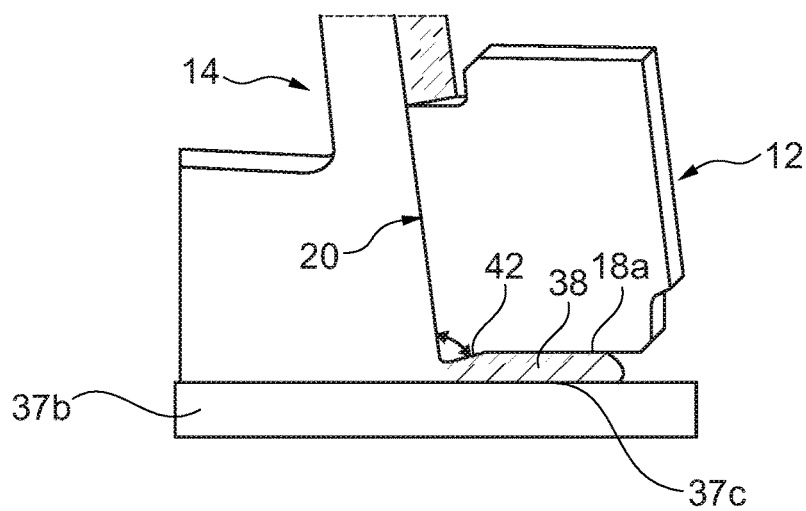

As shown in FIG. 2d, further axial movement of shaft 12 with respect to planet carrier 14 causes splines 20 to force chip material 38 into a radially extending axially facing surface 37c of tool 37b (tool 37a in FIG. 2a operates to guide chip material 38 in the same manner as tool 37b). Chip material 38 is sandwiched between surface 37c of tool 37b and surface 18a of flange section 18. After tool 37b is removed, chip material 38 axially constrains a first axial side of flange section 18. Each spline 20 may create a distinct chip material 38, such that that a plurality of sections of chip material 38 form multiple stakes axially constraining the first axial side of flange section 18.

As shown in FIG. 2e, after chip material 38 is displaced radially inward to axially constrain the first axial side of flange section 18, plate carrier 14 is axially staked to constrain a second axial side of flange section 18 opposite of the first axial side. More specifically, a staking tool 44 is forced axially into an axially facing radially extending surface 22a of radially inner section 22 of planet carrier 14 such that material 46 of planet carrier 14 is forced radially inward and axially into a step section 48 of radially extending surface 18b of flange section 18. Staking via tool 44 forms an indentation 50 in surface 22a. After the staking, shaft 12 and planet carrier 14 are axially constrained on one side by material 38 and on the other side by material 46, with splines 20 being axially between material 38 and material 46. Surface 22a of inner section 22 is axially offset from a radially extending surface 24a of outer section 24 by an outer cylindrical surface 22c of inner section 22. Chip material 38 is provided at a radially extending surface 22b of inner section that is coincident with a radially extending surface 24b of outer section 24.

FIG. 3a shows an embodiment of a planet carrier 114 usable in place of planet carrier 14. Planet carrier 114 is formed in the same manner as planet carrier 14, except that planet carrier 114 includes a step 115 formed by a stop section 116 protruding radially inward from the inner circumference of section 22. In one preferred embodiment, stop section 116 is formed as a continuous ring. As shown in FIG. 3b, stop section 116 provides an axial backstop for chip material 38 and holds material 38 against surface 18a while splines 20 cut into planet carrier 14 during the axial movement of flange section 18 in direction D2. Accordingly, in embodiments where planet carrier 114 includes stop section 116, tool 37a or 37b can be omitted.

Figure 4A:
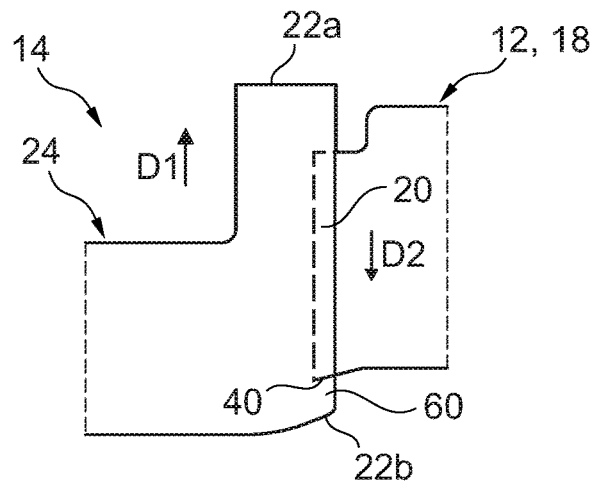
FIGS. 4a to 4c illustrate methods of connecting a planet carrier shaft in accordance with another embodiment of the present disclosure.
Figure 4B:
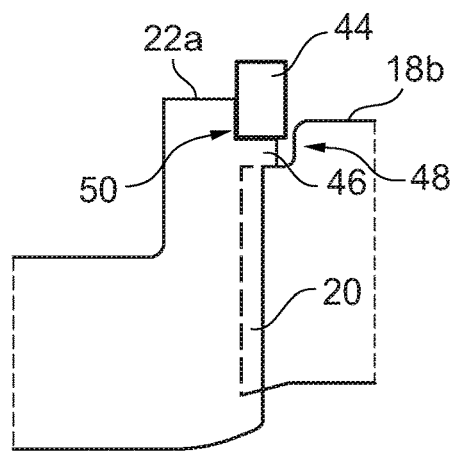
Figure 4C:
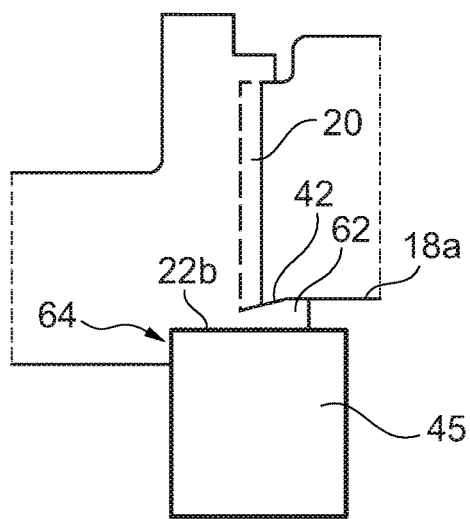

FIGS. 4a to 4c illustrate a method of connecting planet carrier 14 and shaft 12 in accordance with another embodiment of the present disclosure. As similarly noted above, planet carrier 14 is axially moved in direction D1 and/or shaft 12 is axially moved in direction D2 so that splines 20 of flange section 18, led by the lead edge 40 of each spline 20, spline-cut axially aligned grooves into the inner circumferential surface of planet carrier 14, thereby forming axially aligned splines defined between the axially aligned grooves. This axial movement is stopped before lead edges 40 pass entirely through planet carrier 14, so that a ring section 60 of remains at the inner circumference of inner section 22 of planet carrier 14 between lead edges 40 and radially extending surface 22b of inner section 22. In one embodiment, which is shown in FIG. 4d, ring section 60 is relied on to axially restrain shaft 12 and planet carrier 14 with respect to each other by contacting displacement sections 42 of splines 20.

After shaft 12 is joined to planet carrier 14 via spline-cutting, as shown in FIG. 4b and as similarly discussed above with respect to FIG. 2e, a staking tool 44 is forced axially into radially extending surface 22a of radially inner section 22 of planet carrier 14 such that material 46 of planet carrier 14 is forced radially inward and axially into step section 48 of radially extending surface 18b of flange section 18. Staking via tool 44 forms an indentation 50 in surface 22a.

Figure 4E:
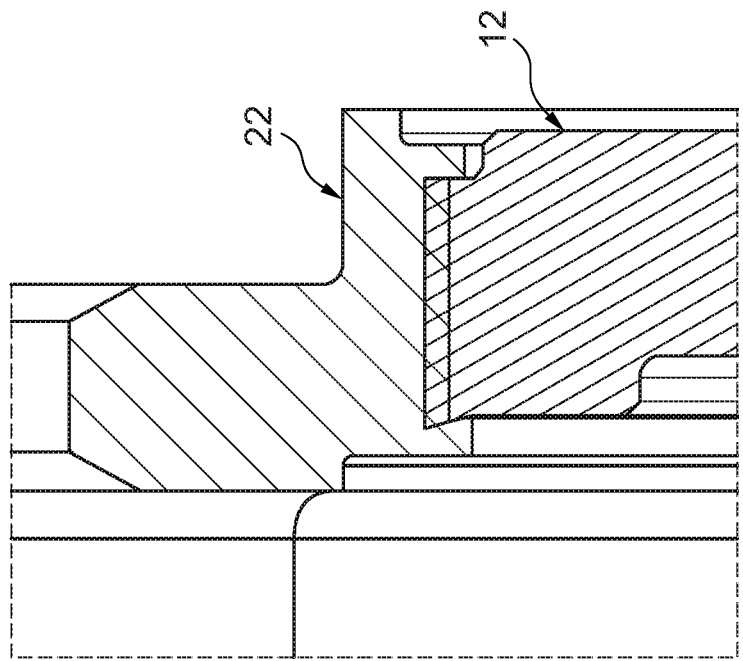
FIGS. 4d and 4e illustrate further embodiments of the planet carrier and shaft connected with the methods shown in FIGS. 4a to 4c.

In the embodiment shown in FIG. 4e, as shown in FIG. 4c, a further staking tool 45 is forced axially into radially extending surface 22b of radially inner section 22 of planet carrier 14 such that material 62 planet carrier of 14 is forced radially inward and axially into axial contact with radially extending surface 18a of flange section 18, both at displacement section 42 and radially inward of displacement section 42. Staking via tool 45 forms an indentation 64 in surface 22b.

Figure 4D:
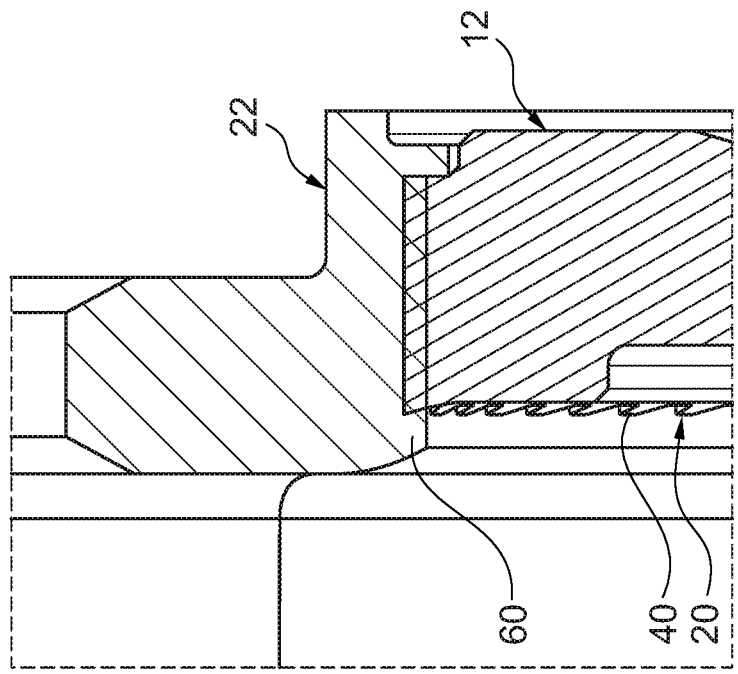

Accordingly, in the embodiment shown in FIG. 4d, where the inner section 22 of planet carrier 14 is staked on only one axial side, shaft 12 and planet carrier 14 are axially constrained on one side by ring section 60 and on the other side by staked material 46, with splines 20 being axially between ring section 60 and material 46.

In the embodiment shown in FIG. 4e, where the inner section 22 of planet carrier 14 is staked on both axial sides, shaft 12 and planet carrier 14 are axially constrained on one side by staked material 62 and on the other side by staked material 46, with splines 20 being axially between staked material 62 and staked material 46.

In both the embodiment in FIG. 4d and the embodiment in FIG. 4e, a subsequent operation may be used to remove most of the chip material after assembly. The subsequent operation may involve a turning operation, piercing the chips material off, or some other technique for removing the chip material.

Figure 5A:
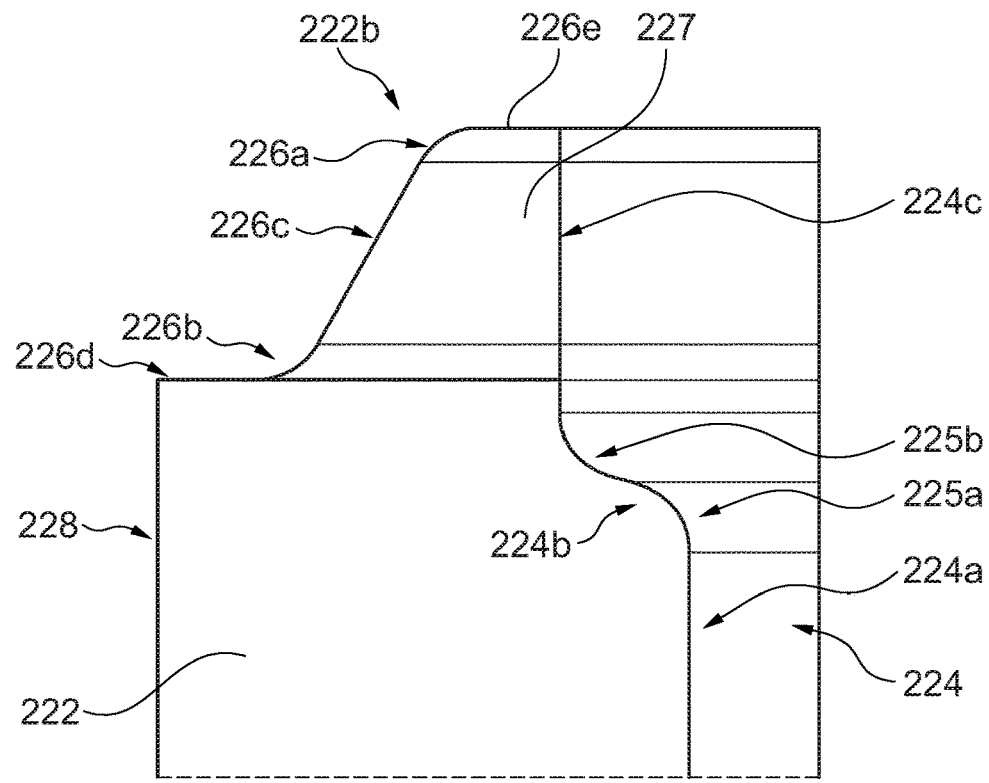
FIGS. 5a, 5b show an embodiment of a planet carrier in accordance with another embodiment of the present disclosure.
Figure 5B:
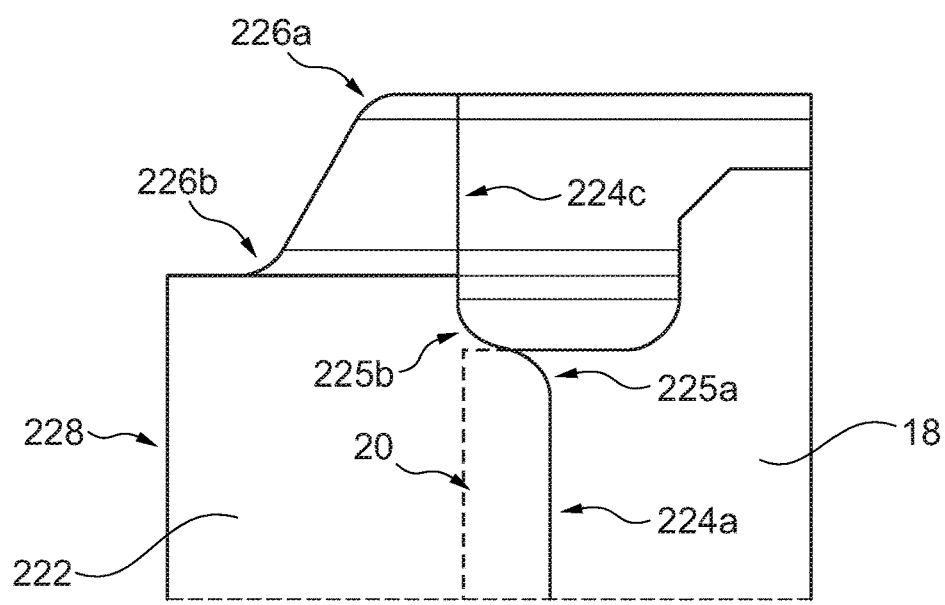

FIGS. 5a, 5b show an embodiment of a planet carrier 214 usable in place of planet carrier 14. Planet carrier 214 is formed in the same manner as planet carrier 14, except that planet carrier 214 includes an inner section 222 formed in a different manner than inner section 22. FIG. 5a shows a standalone view of a portion of section 22 and FIG. 5b shows view of a portion of section 222 and flange section 18 illustrating where flange section 18 would be positioned after spline-cutting.

As shown in FIG. 5a, section 222 has a shape that is advantageous for spline joining and staking. An inner circumferential surface 224 of section 222 includes an innermost cylindrical surface section 224a for interfering with splines 20 of flange 18, a radially extending section 224b for first contacting lead edge 40 (FIGS. 2c, 2d) and a centering section 224c for centering flange section 18 within the center borehole of planet carrier 214. Radially extending section 224b extends radially outward from section 224a to section 224c and includes a radially inner convex portion 225a and a radially outer concave portion 225b. During the spline-cutting, lead edge 40 contacts concave portion 225b. Centering section 224c has a generally cylindrical shape that is slightly tapered radially outward as it extends away from section 225b. It is noted that FIG. 5b is illustrative of the relative position of section 222 and flange section 18 after the spline-cutting operation, but does not show the changes to inner circumferential surface 224 that occur during spline-cutting.

Section 222 further includes a radially extending axially facing surface 222b. Surface 222b includes a staking section 226a for being staked to axially constrain shaft 12 and planet carrier 214 with respect to each other and a stability section 226b that limits a radial deformation of outer circumferential surface 228 of section 222 during staking. Staking section 226a may have a convex shape and stability section 226b may have a concave shape. Staking section 226a and stability section 226b are joined by an inclined section 226c having a frustoconical shape, and stability section 226b is joined with outer circumferential surface 228 by a radially extending section 226d that is configured for extending perpendicularly to center axis CA (FIG. 1c). Staking section 226a is joined with centering section 224c by a radially extending section 226e that is configured for extending perpendicularly to center axis CA. Surface sections 224c, 226a, 226c, 226e together form an axial protrusion 227, which may be ring, protruding axially from surface section 226d.

Figure 5C:
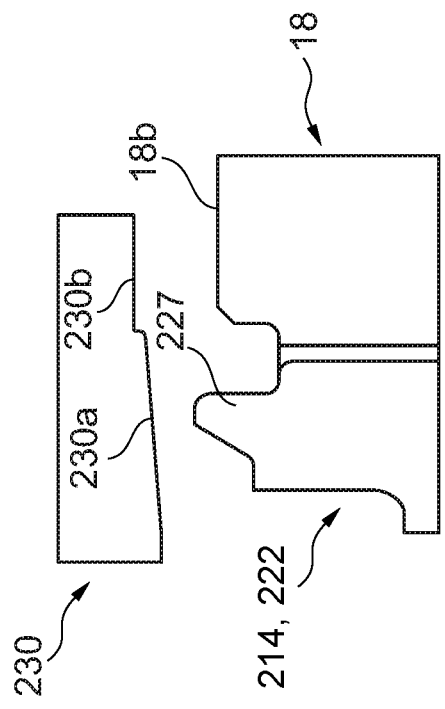
FIGS. 5c and 5d show the staking of the planet carrier shown in FIGS. 5a and 5b.
Figure 5D:
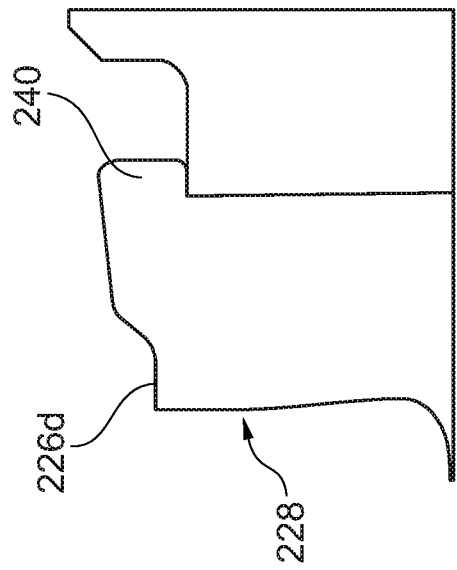
Figure 6A:
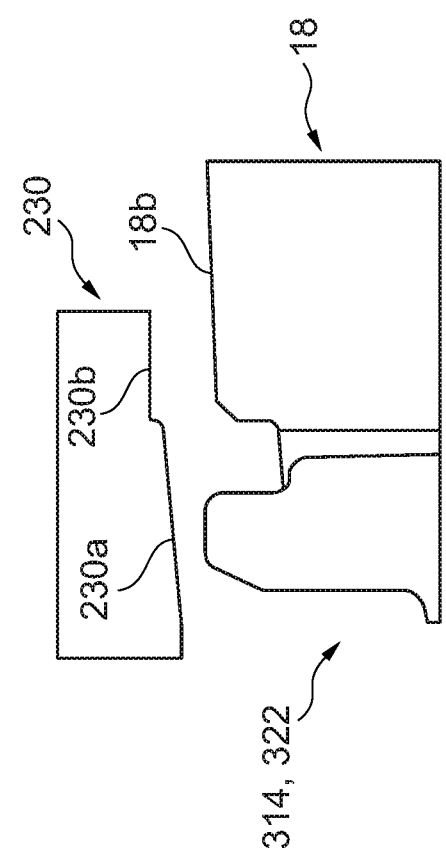
FIGS. 6a and 6b show the staking of another planet carrier.
Figure 6B:
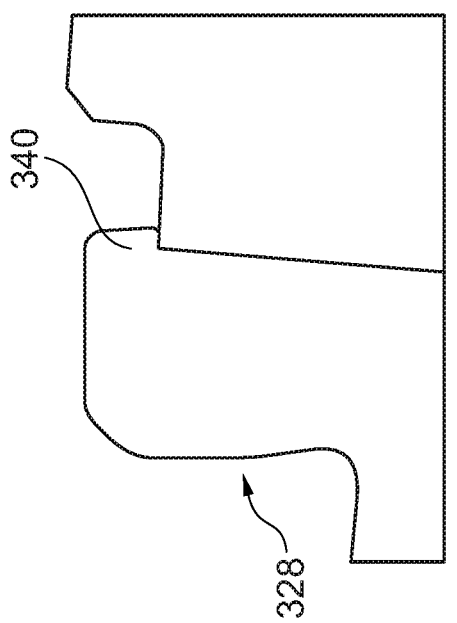

Comparing FIGS. 5c and 5d, which show the staking of section 222 of planet carrier 214 to flange section 18, with FIGS. 6a and 6b, which show the staking of a section 322 of a planet carrier 314 to flange section 18, illustrates the advantages of the shape of section 222. In both FIGS. 5c and 6a, a staking tool 230 including an inclined staking surface 230a for contacting section 222 or section 322 and a flat abutment surface 230b for contacting radially extending surface 18b of flange section 18 is used to stake section 222 and 322. More specifically, inclined staking surface 230a contacts staking section 226a of axial protrusion 227.

As shown by comprising FIGS. 5d and 6b, after staking, a staked material 240 of section 222 radially overlaps with flange section 18 to a greater degree than a staked material 340 of section 322. Also, outer circumferential surface 228 of section 222 has deformed less than outer circumferential surface 328 of section 322. Radially extending section 226d remains largely unchanged, with staked material 240 producing axially past radially extending section 226d.

The embodiment shown in FIGS. 5a to 5d may minimize the amount of deflection of the axially facing radially extending surface 25c (FIG. 1c) of planet carrier 214 relative to the center axis CA (FIG. 1b) and also maximizing the amount of overlap of the staking itself, as can be seen by comparing FIGS. 5d and 6b.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

LIST OF REFERENCE NUMERALS

CA center axis
D1, D2 axial directions
10 drive assembly
12 shaft
14 planet carrier
16 shaft base section
18 shaft flange section
18a, 18b axially facing radially extending surfaces
20 axially extending splines
20a outer circumferential surface
22 cylindrical radially inner section
22a, 22b axially facing radially extending surfaces
24 annular radially outer section
24a, 24b axially facing radially extending surfaces
25a flat plate base section
25b circumferentially spaced connector sections
25c axially facing radially extending surface
26 holes
28 planet pins
28a, 28b axial ends
30 further planet carrier
30a connector section
31 fasteners
32 holes
34 planet gears
36 rolling members
37a, 37b fixed tool
37c radially extending axially facing surface
38 chip material
40 lead edge
42 displacement section
44, 45 staking tool
46 staked material
48 step section
50 indentation
60 ring section
62 staked material
64 indentation
114 planet carrier
115 step
116 stop section
214 planet carrier
222 cylindrical radially inner section
222b radially extending axially facing surface
224 inner circumferential surface
224a innermost cylindrical surface section
224b radially extending section
224c centering section
225a radially inner convex portion
225b radially outer concave portion
226a staking section
226b stability section
226c inclined section
226d radially extending section
226e radially extending section
227 axial protrusion
228 outer circumferential surface
230 staking tool
230a inclined staking surface
230b flat abutment surface
240 staked material
314 planet carrier
322 cylindrical radially inner section
328 outer circumferential surface
340 staked material

What is claimed is:

1. A drive assembly for a motor vehicle drive train comprising:
   a shaft including a plurality of axially extending splines defining an outer circumferential surface; and
   a planet carrier non-rotatably fixed to the shaft by the axially extending splines, the planet carrier and the shaft being axially constrained with respect to each other by a radially inwardly extending material of the planet carrier axially contacting a radially extending surface of the shaft;
   wherein each of the axially extending splines includes an angled displacement section axially contacting the planet carrier.

2. The drive assembly as recited in claim 1 wherein the radially inwardly extending material is formed of chip material cut out of an inner circumferential surface of the planet carrier.

3. The drive assembly as recited in claim 1 wherein the radially inwardly extending material is a staked portion of the planet carrier.

4. The drive assembly as recited in claim 1 wherein the planet carrier and the shaft are axially constrained with respect to each other by a further radially inwardly extending material contacting a further radially extending surface of the shaft, the axially extending splines being axially between the radially inwardly extending material and the further radially inwardly extending material.

5. The drive assembly as recited in claim 4 wherein the radially inwardly extending material is formed of chip material cut out of an inner circumferential surface of the planet carrier and the further radially inwardly extending material is a staked portion of the planet carrier.

6. The drive assembly as recited in claim 1 wherein the shaft includes a longitudinal base section and a flange section extending radially outward from the longitudinal base section, the flange section including the radially extending surface axially contacting the radially inwardly extending material of the planet carrier.

7. The drive assembly as recited in claim 1 wherein the planet carrier includes a cylindrical radially inner section having an inner circumferential surface that is mated with the axially extending splines and an annular radially outer section extending radially outward from the cylindrical radially inner section, the radially inwardly extending material extending radially inward past the inner circumferential surface of the cylindrical radially inner section.

8. The drive assembly as recited in claim 7 wherein the radially inwardly extending material protrudes axially past a radially extending surface of the cylindrical radially inner section.

9. The drive assembly as recited in claim 7 wherein the annular radially outer section includes a plurality of holes passing axially therethrough each configured for receiving a first axial end of a respective one of a plurality of planet pins.

10. The drive assembly as recited in claim 9 further comprising the planet pins and a plurality of planet gears each rotatably mounted on a respective one of the planet pins.

11. A method of forming a drive assembly for a motor vehicle drive train comprising:
spline-cutting a planet carrier with axially extending splines defining an outer circumferential surface of a shaft to non-rotatably fix the planet carrier to the shaft; and
axially constraining the planet carrier and the shaft with respect to each other by forcing a radially inwardly extending material of the planet carrier into axial contact with a radially extending surface of the shaft.

12. The method as recited in claim 11 wherein the forcing of the radially inwardly extending material of the planet carrier into axial contact with the radially extending surface of the shaft includes forcing chip material cut out of an inner circumferential surface of the planet carrier by the axially extending splines into axial contact with the radially extending surface of the shaft.

13. The method as recited in claim 12 wherein the spline-cutting of the planet carrier with the axially extending splines including axially forcing an angled displacement section of each of the axially extending splines into the planet carrier to cut out the chip material, the angled displacement section forcing the chip material radially inward into a radially extending stop surface to form the radially inwardly extending material.

14. The method as recited in claim 11 wherein the forcing of the radially inwardly extending material of the planet carrier into axial contact with the radially extending surface of the shaft includes axially staking the planet carrier.

15. The method as recited in claim 14 wherein the planet carrier includes a cylindrical radially inner section having an inner circumferential surface that is mated with the axially extending splines and an annular radially outer section extending radially outward from the cylindrical radially inner section, the radially inwardly extending material extending radially inward past the inner circumferential surface of the cylindrical radially inner section, the cylindrical radially inner section including a radially extending axially facing surface including a staking section that is axially staked to axially constrain the shaft and the planet carrier with respect to each other and a stability section limiting a radial deformation of an outer circumferential surface the cylindrical radially inner section during the axial staking.

16. The method as recited in claim 11 further comprising further axially constraining the planet carrier and the shaft with respect to each other by forcing a further radially inwardly extending material of the planet carrier into axial contact with a further radially extending surface of the shaft, the axially extending splines being axially between the radially inwardly extending material and the further radially inwardly extending material.

17. The method as recited in claim 16 wherein the forcing of the radially inwardly extending material of the planet carrier into axial contact with the radially extending surface of the shaft includes forcing chip material cut out of an inner circumferential surface of the planet carrier by the axially extending splines into axial contact with the radially extending surface of the shaft and the forcing of the further radially inwardly extending material of the planet carrier into axial contact with the further radially extending surface of the shaft includes axially staking the planet carrier.

18. The method as recited in claim 16 wherein the forcing of the radially inwardly extending material of the planet carrier into axial contact with the radially extending surface of the shaft includes axially staking the planet carrier and the forcing of the further radially inwardly extending material of the planet carrier into axial contact with the further radially extending surface of the shaft includes axially staking the planet carrier.

19. A drive assembly for a motor vehicle drive train comprising:
a shaft including a plurality of axially extending splines defining an outer circumferential surface; and
a planet carrier non-rotatably fixed to the shaft by the axially extending splines, the planet carrier and the shaft being axially constrained with respect to each other by a radially inwardly extending material of the planet carrier axially contacting a radially extending surface of the shaft;
wherein the shaft includes a longitudinal base section and a flange section extending radially outward from the longitudinal base section, the flange section including the radially extending surface axially contacting the radially inwardly extending material of the planet carrier.

* * * * *